(12) United States Patent
Frederick et al.

(10) Patent No.: US 10,005,413 B2
(45) Date of Patent: Jun. 26, 2018

(54) VEHICLES INCLUDING FRONT GRILLE ASSEMBLIES WITH AIR FLOW DIRECTOR FINS

(71) Applicant: Toyota Motor Engineering & Manufacturing North America, Inc., Erlanger, KY (US)

(72) Inventors: Scott L. Frederick, Brighton, MI (US); Paxton S. Williams, Milan, MI (US); Vanessa Antar, Ann Arbor, MI (US); Daniel B. Gidcumb, West Bloomfield, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/285,962

(22) Filed: Oct. 5, 2016

(65) Prior Publication Data
US 2018/0093628 A1   Apr. 5, 2018

(51) Int. Cl.
*B60R 19/52* (2006.01)
*B60K 11/08* (2006.01)
*B60K 11/04* (2006.01)

(52) U.S. Cl.
CPC .............. *B60R 19/52* (2013.01); *B60K 11/04* (2013.01); *B60K 11/08* (2013.01); *B60R 2019/525* (2013.01)

(58) Field of Classification Search
CPC ....... B60K 11/08; B60K 11/085; B60K 11/04; B60R 19/52; B60R 19/18; B60R 21/34; B60R 19/12
See application file for complete search history.

(56) References Cited

U.S. PATENT DOCUMENTS

| | | | |
|---|---|---|---|
| 6,644,389 B1 | 11/2003 | Kang et al. | |
| 6,880,655 B2 | 4/2005 | Suwa et al. | |
| 6,886,872 B2* | 5/2005 | Matsumoto | B60R 19/12 293/115 |
| 7,234,555 B2 | 6/2007 | Khouw et al. | |
| 7,325,861 B2* | 2/2008 | Zacheiss | B60R 19/12 180/68.4 |
| 7,517,006 B2 | 4/2009 | Kageyama et al. | |
| 8,998,293 B2* | 4/2015 | Glickman | B60K 11/08 180/68.1 |
| 2004/0124643 A1* | 7/2004 | Matsumoto | B60R 19/12 293/115 |
| 2007/0182171 A1* | 8/2007 | Kageyama | B60R 21/34 293/102 |

(Continued)

FOREIGN PATENT DOCUMENTS

CN             203902466             10/2014

*Primary Examiner* — Hau V Phan
(74) *Attorney, Agent, or Firm* — Dinsmore & Shohl LLP (57) ABSTRACT

A front grille assembly for a vehicle includes a grille deflector that allows air to flow therethrough into an engine compartment of the vehicle. A grille frame supports the grille deflector at a front of the vehicle. An air flow director fin is located on the grille frame and rearward of the grille deflector. The air flow director fin modifies a flow direction of air entering the engine compartment from an unmodified flow direction without the air flow director fin to a modified flow direction toward a region of a transmission cooler of the vehicle.

20 Claims, 7 Drawing Sheets

(56) References Cited

U.S. PATENT DOCUMENTS

| | | | |
|---|---|---|---|
| 2008/0023173 A1* | 1/2008 | Savage | B60H 1/00328 165/41 |
| 2008/0093868 A1* | 4/2008 | Steller | B60R 19/18 293/142 |
| 2010/0127520 A1* | 5/2010 | Ginja | B60R 19/12 293/146 |
| 2010/0175864 A1 | 7/2010 | Fujino et al. | |
| 2011/0204680 A1* | 8/2011 | Fortin | B60R 19/18 296/193.1 |
| 2011/0240257 A1* | 10/2011 | Piggott | F28D 1/05366 165/67 |
| 2011/0240387 A1* | 10/2011 | Piggott | B60K 11/04 180/68.4 |
| 2013/0152882 A1* | 6/2013 | Potter | F16H 57/0413 123/41.33 |
| 2013/0244562 A1* | 9/2013 | Maurer | F01P 11/10 454/152 |
| 2014/0132033 A1* | 5/2014 | Townson | B62D 25/084 296/193.1 |
| 2014/0291056 A1* | 10/2014 | Takanaga | B60K 11/085 180/274 |

* cited by examiner

VEHICLES INCLUDING FRONT GRILLE ASSEMBLIES WITH AIR FLOW DIRECTOR FINS

TECHNICAL FIELD

The present specification generally relates to front grille assemblies of vehicles and, more specifically, to front grille assemblies that include air flow director fins.

BACKGROUND

Vehicle transmissions generally generate substantial amounts of heat that is typically cooled by a radiator. The vehicles often include a front grille that allows air flow over the radiator for cooling, but also provides protection for the radiator and vehicle engine. The front grille can also serve an aesthetic purpose to provide a pleasing front fascia.

With changing front grille designs, air flow may be affected, which can affect the cooling performance of the radiator and other cooling components, such as a transmission cooler. Transmission coolers may be provided for additional cooling of fluid flowing from the transmission. The transmission coolers may rely on air flowing through the front grille to provide cooling of the fluid. However, the front grille may affect the air flow to the transmission cooler.

Accordingly, a need exists for front grille assemblies having air flow directing features that can be used to modify air flow entering the engine compartment through the front grilles.

SUMMARY

In one embodiment, a vehicle includes an engine compartment, a radiator located in the engine compartment and a transmission cooler located forward of the radiator in a vehicle longitudinal direction. The transmission cooler is configured to receive transmission fluid from a transmission that has been cooled by the radiator. A front grille assembly is located forward of the transmission cooler in the vehicle longitudinal direction. The front grille assembly includes a grille deflector that allows air to flow therethrough and into the engine compartment. A grille frame supports the grille deflector at a front of the vehicle. An air flow director fin is located on the grille frame and rearward of the grille deflector. The air flow director fin modifying a flow direction of air entering the engine compartment from an unmodified flow direction without the air flow director fin to a modified flow direction toward a region of the transmission cooler.

In another embodiment, a front grille assembly for a vehicle includes a grille deflector that allows air to flow therethrough into an engine compartment of the vehicle. A grille frame supports the grille deflector at a front of the vehicle. An air flow director fin is located on the frame and rearward of the grille deflector. The air flow director fin modifies a flow direction of air entering the engine compartment from an unmodified flow direction without the air flow director fin to a modified flow direction toward a region of a transmission cooler of the vehicle.

In another embodiment, a method of directing air to a transmission cooler within an engine compartment of a vehicle is provided. The method includes connecting a front grille assembly to a front of the vehicle. The front grille assembly includes a grille deflector that allows air to flow therethrough and into the engine compartment. A grille frame supports the grille deflector at a front of the vehicle. An air flow director fin is located on the frame and rearward of the grille deflector. The air flow director is positioned nearer an inboard edge of the transmission cooler in a vehicle lateral direction than an outboard edge of the transmission cooler. The air flow director fin modifies a flow direction of air entering the engine compartment from an unmodified flow direction without the air flow director fin to a modified flow direction toward a region of the transmission cooler.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicles and front grille assemblies that can modify air flow entering an engine compartment through front grilles using air flow directing features. The vehicles may generally include an engine compartment including the front grille assembly located at a front end of the vehicle. Within the engine compartment may be an engine, a transmission that transmits output from the engine to the vehicle's drive wheels, a radiator that cools transmission fluid flowing from the transmission and a transmission cooler that may be used to provide additional cooling for the transmission fluid. The transmission cooler may rely primarily on air flow through the front grille assembly. To this end, the transmission cooler may be located in front of the radiator and between the radiator and the front grille assembly. The front grille assembly may include an air flow director fin that can be used to modify the flow of air through the front grille assembly to improve air flow toward areas of the transmission cooler compared to the absence of the air flow director fin.

Figure 1:
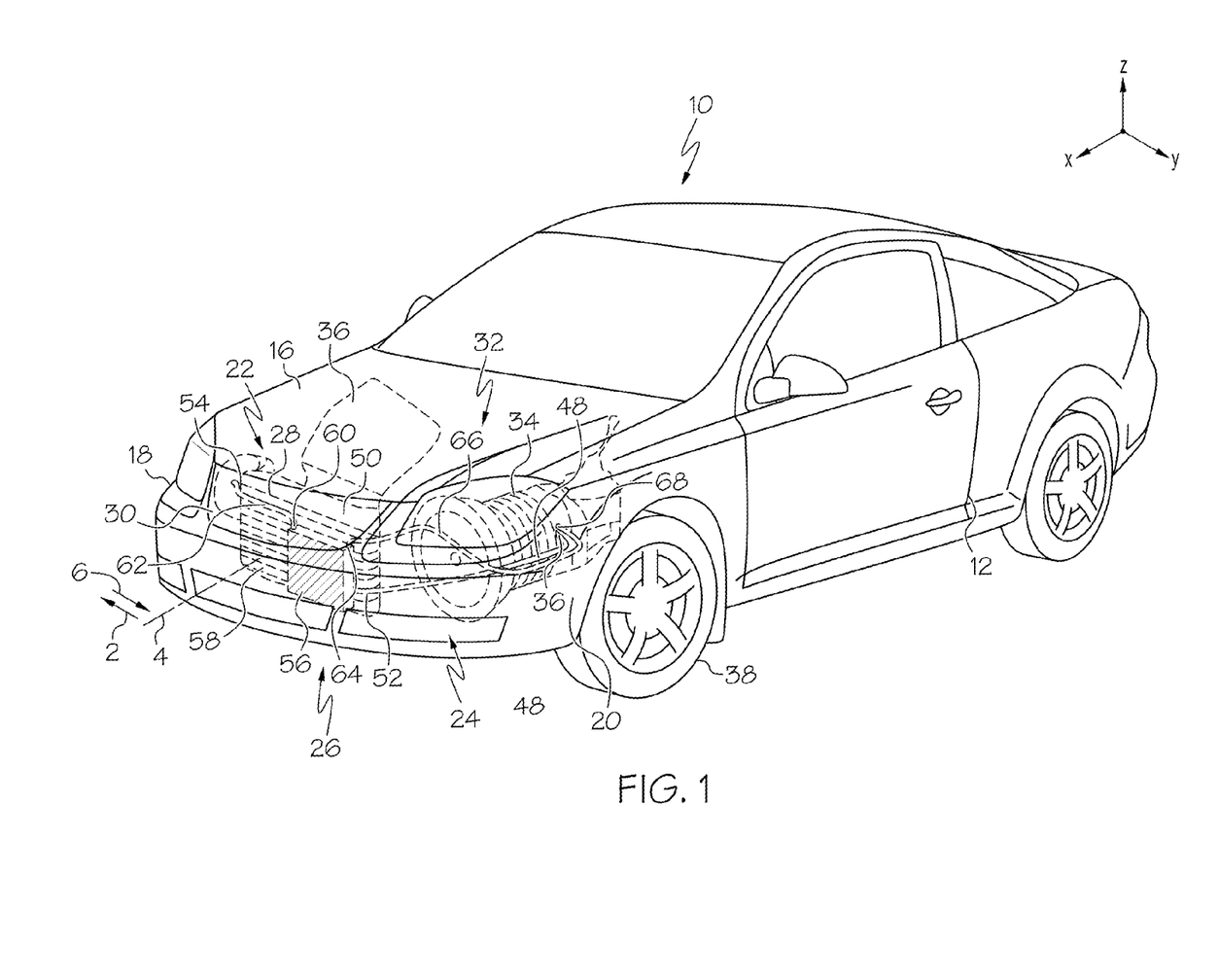
FIG. 1 depicts a perspective view of a vehicle including a transmission cooler, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 includes a vehicle body 12 having a front end assembly 14 that includes a hood 16, front fenders 18 and 20, an upper grille assembly 22, a front bumper structure 24 and a lower grille assembly 26. The upper grille assembly 22 and the lower grille assembly 26 are connected to the front bumper structure 24 and are located between the front fenders 18 and 20. Generally, the upper grille assembly 22 includes a covering portion, referred to herein as a front grille assembly 28 with a grille deflector 30, such as a mesh or other suitable covering that protects a radiator 50 that is located behind the front grille assembly 28 within an engine compartment 32, while allowing air to flow past the covering and over the radiator 50.

A transmission 34 is provided within the engine compartment 32 that transmits output of a vehicle engine 36, such as an internal combustion engine or hybrid engine, to two or more wheels 38. In maintaining the vehicle engine 36 within a predetermined range of revolutions per minute (RPM) over a wide range of vehicle speeds, the transmission 34 generates heat. A transmission fluid can be used to reduce the heat generated by the transmission 34. The transmission fluid is generally directed along a closed loop path which, after cooling the transmission 34 leaves the transmission through an outlet 46 and travels along a transmission fluid passageway 48 (i.e., a conduit), toward the radiator 50 and enters the radiator 50 through an inlet 52 for a transmission fluid cooling operation. After cooling in the radiator 50, the transmission fluid exits the radiator 50 through an outlet 54 and is directed to a transmission cooler 56.

The transmission cooler 56 may be mounted at a forward facing side 58 of the radiator 50. The transmission cooler 56 may be mounted on this side of the radiator 50 for increased exposure to air entering the engine compartment 32 through the front grille assembly 28. Such increase in exposure to air can provide the transmission cooler 56 with greater heat transfer characteristics. The transmission fluid enters the transmission cooler 56 through an inlet 60. As can be seen, the transmission cooler 56 may be in-line with transmission fluid passageway 62. After passing through the transmission cooler 56, the cooled transmission fluid may exit the transmission cooler 56 through an outlet 64 and travel along transmission fluid passageway 66 to an inlet 68 of the transmission 34 for another transmission cooling operation.

Figure 2:
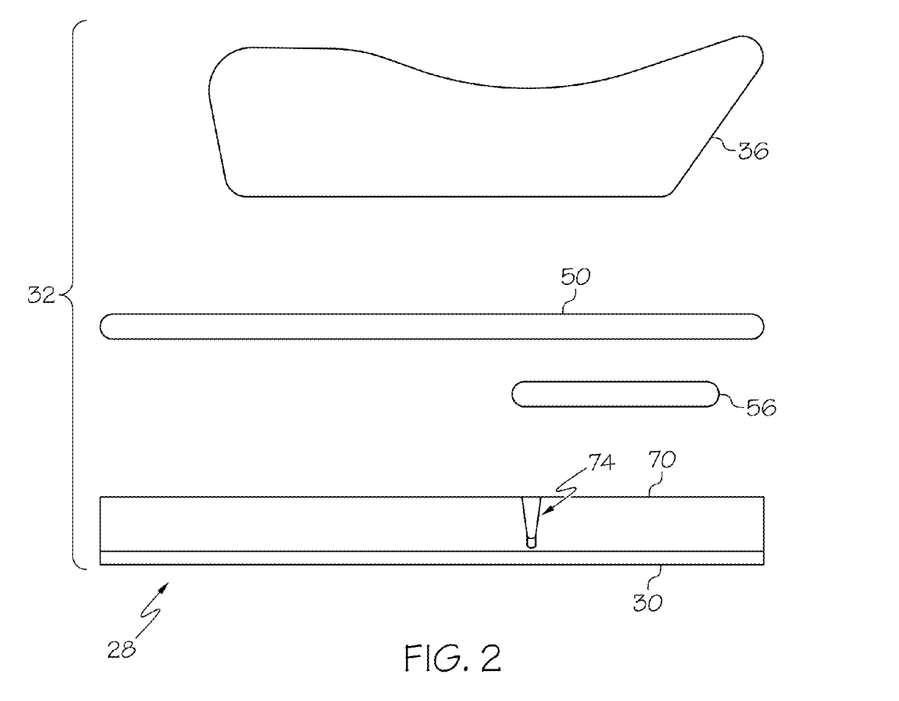
FIG. 2 is a diagrammatic view of an engine compartment of the vehicle of FIG. 1 illustrating an air flow director fin, according to one or more embodiments shown and described herein.

Referring briefly to FIG. 2, the engine compartment 32 is illustrated diagrammatically including the vehicle engine 36, the radiator 50, the transmission cooler 56 and the front grille assembly 28. As discussed above, the transmission cooler 56 is located forward of the radiator 50 and is located between the radiator 50 and the front grille assembly 28. The front grille assembly 28 includes the grille deflector 30 and a grille frame 70 that is used to hold and support the grille deflector 30 at the front of the vehicle 10.

With the vehicle 10 moving, air is forced through the grille deflector 30, into the engine compartment 32 and toward the transmission cooler 56, radiator 50 and vehicle engine 36. Depending on features of the grille deflector 30, such as size and shape, the shape and direction of the air flow into the engine compartment 32 may have some level of impact (positive or negative) on air flow and cooling components within the engine compartment 32, such as the transmission cooler 56. In this regard, the front grille assembly 28 includes an air flow director fin 74 that can be used to modify the flow of air through the front grille assembly 28 to improve air flow toward areas of the transmission cooler 56 compared to the absence of the air flow director fin 74.

Figure 3:
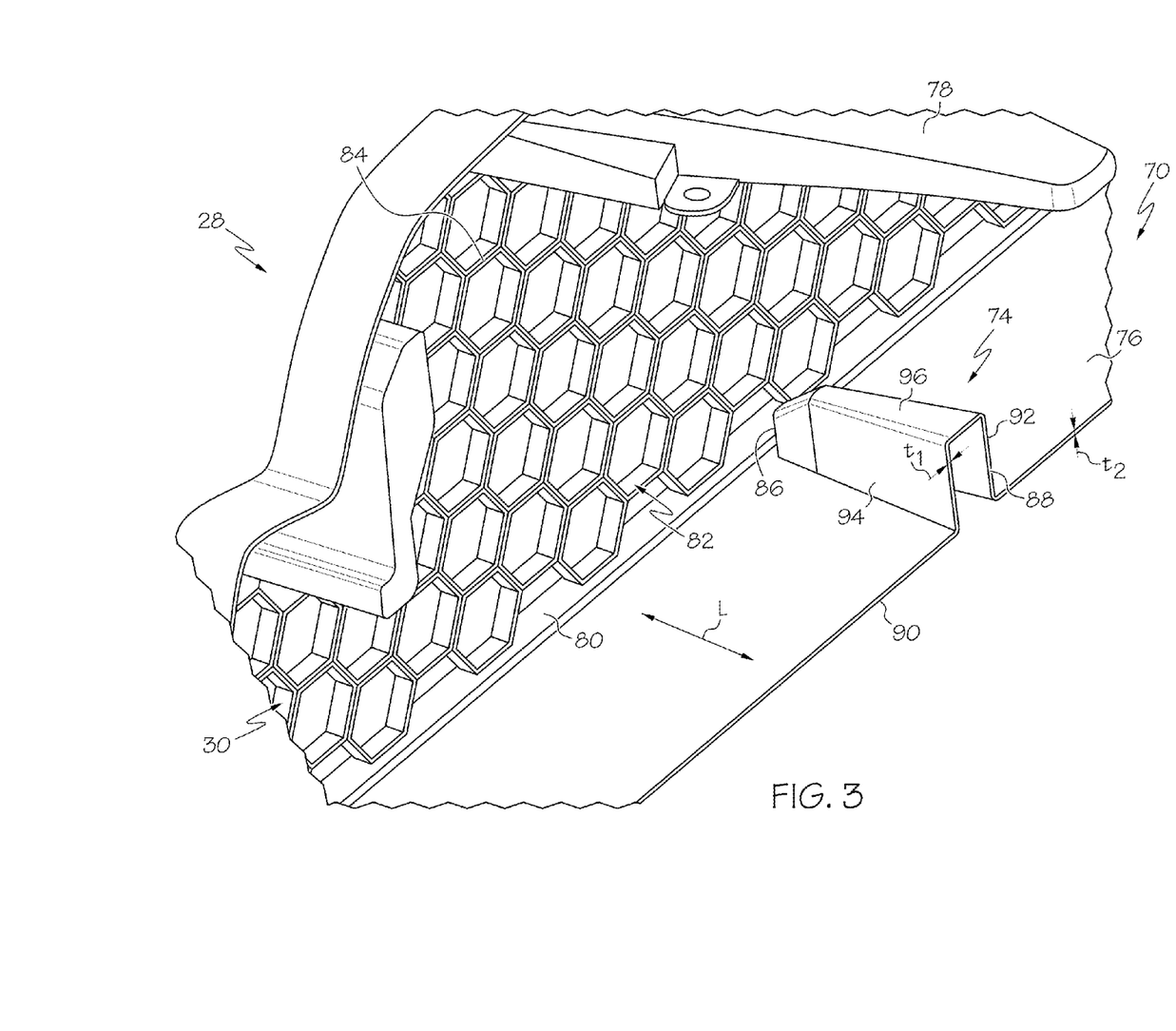
FIG. 3 is a perspective view of a front grille assembly for use with the vehicle of FIG. 1 including the air flow director fin, according to one or more embodiments shown and described herein.

FIG. 3 illustrates the front grille assembly 28 in isolation and includes the grille deflector 30 and the grille frame 70 that supports the grille deflector 30 at within the upper grille assembly 22 of the vehicle 10. In this embodiment, the grille frame 70 includes a lower support ledge 76 and an upper support ledge 78 that is connected to the lower support ledge 76 providing an enclosure that at least partially surrounds the grille deflector 30. The grille deflector 30 may be a unitary component that includes a frame member 80 that engages the lower support ledge 76 of the grille frame 70 and supports a mesh structure 82 between the upper support ledge 78 and the lower support ledge 76. In the illustrated embodiment, the mesh structure 82 is formed of a plurality of side-by-side hexagonal structures 84; however, other shapes may be utilized with the grille deflector 30.

The air flow director fin 74 has a front end 86 that is located near the grille deflector 30 and a rear end 88 that intersects a terminating end 90 of the lower support ledge 76 and is supported on and extends in the vehicle longitudinal direction along a length L of the lower support ledge 76. In the illustrated embodiment, the air flow director fin 74 is formed integrally (e.g., molded) with the lower support ledge 76 and includes a first side wall 92 that extends outwardly from the lower support ledge 76, a second side wall 94 that extends outwardly from the lower support ledge 76 and a top wall 96 that extends between and connects the first side wall 92 and the second side wall 94. The front end 86 may be closed and the rear end 88 may be open forming a somewhat inverted U-shape in cross-section along at least part of the length of the air flow director fin 74 in the vehicle longitudinal direction. In other words, the air flow director fin 74 may be hollow between the first and second side walls 92 and 94, the top wall 96 and the front end 86, which is closed. In some embodiments, the first and second side walls 92 and 94, the top wall 96 and/or the front end 86 may have a wall thickness $t_1$ that is substantially the same as a wall thickness $t_2$ of the lower support ledge 76 adjacent the air flow director fin 74.

Figure 4:
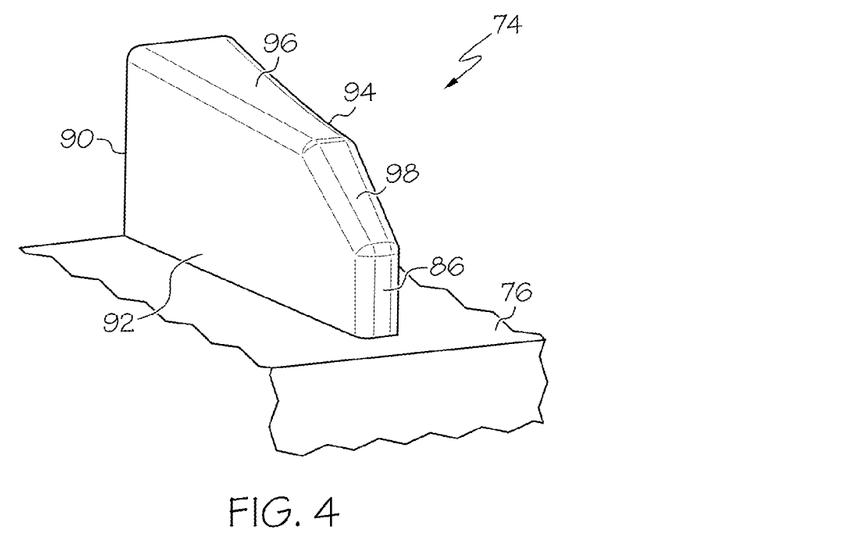
FIG. 4 is a perspective view of the air flow director fin of FIG. 3, according to one or more embodiments shown and described herein.
Figure 5:
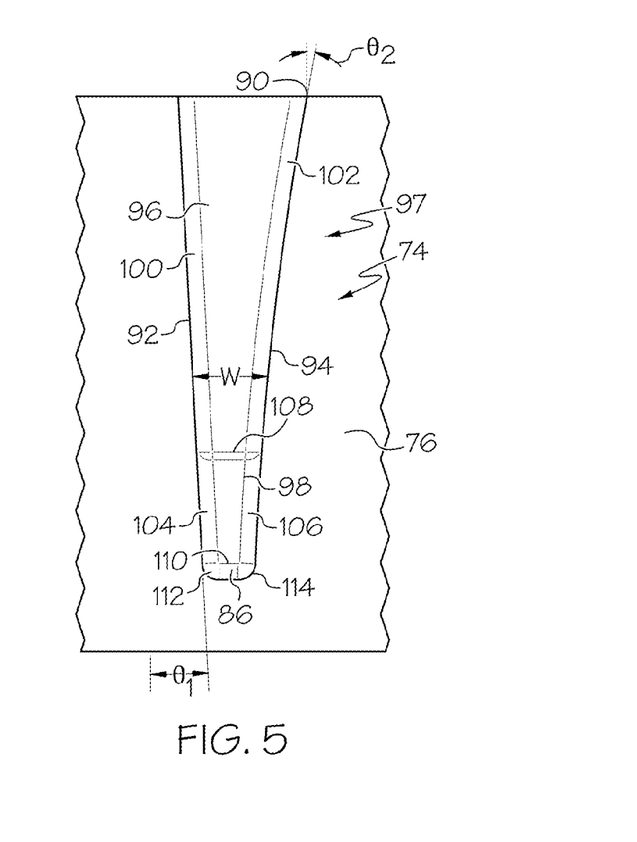
FIG. 5 is a top view of the air flow director fin of FIG. 3, according to one or more embodiments shown and described herein.

Referring to FIGS. 4 and 5, the air flow director fin 74 is shown in isolation extending outwardly from a portion of the lower support ledge 76. The air flow director fin 74 includes the front end 86, the rear end 88, first and second side walls 92 and 94 and top wall 96. A taper portion 98 tapers downwardly in height to the front end 86 and provides a ramp-shaped, tapered transition from the top wall 96 to the front end 86 of reduced height. As can be seen, the air flow director fin 74 increases in width W from the front end 86 and has the smallest width to the rear end 88 having the largest width. This increase in width may be due to one or both of the first and second side walls 92 and 94 extending away from one another in the vehicle lateral direction. In the illustrated example, the first side wall 92 extends at a relatively small angle $\theta_1$ to the vehicle longitudinal direction compared to at least a portion of the second side wall 94. In some embodiments, the small angle $\theta_1$ may be less than about 10 degrees, such as less than about five degrees, such as between about one and about five degrees.

The second side wall 94 may also extend at an angle $\theta_2$ to the vehicle longitudinal direction. Where the angle $\theta_1$ of the first side wall 92 may be substantially constant from the front end 86 to the rear end 88, the angle $\theta_2$ may change (e.g., increase) from the front end 86 to the rear end 88. In some embodiments, the second side wall 94 may have a curved portion 97 having an increasing $\theta_2$ and a radius of curvature r such that the width W of the air flow director fin 74 increases at a greater rate toward the rear end 88.

The intersections between any of the walls 92, 94, 96, taper portion 98 and front end 86 may be radiused. In the illustrated embodiment, the intersection 100 between the top wall 96 and the first side wall 92 is radiused, the intersection 102 between the top wall 96 and the second side wall 94 is radiused. Likewise, the intersections 104 and 106 between taper portion 98 and the first and second side walls 92 and 94 may be radiused and the intersections 108 and 110 between the taper portion 98 and the top wall 96 and the front end 86 may be radiused. Further, the intersections 112 and 114 between the front end 86 and the first and second side walls 92 and 94 may be radiused. Having all intersections radiused can provide a smooth fin structures without sharp, square angles.

Figure 6:
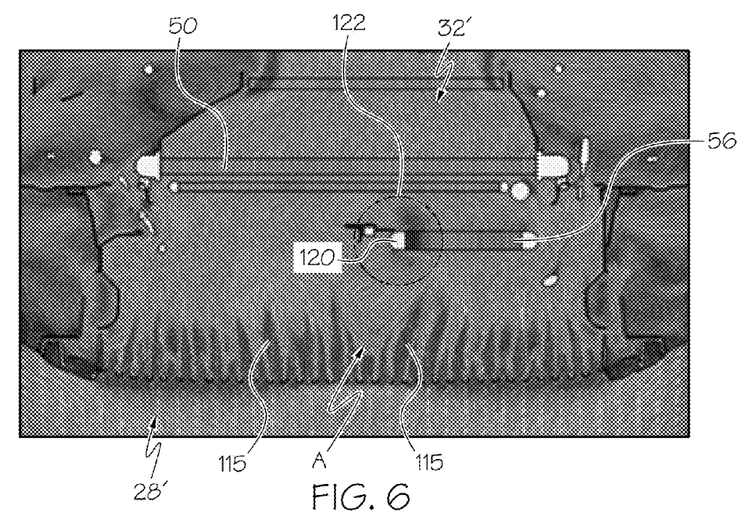
FIG. 6 shows an unmodified air flow through a front grille assembly without an air flow director fin, according to one or more embodiments shown and described herein.
Figure 7:
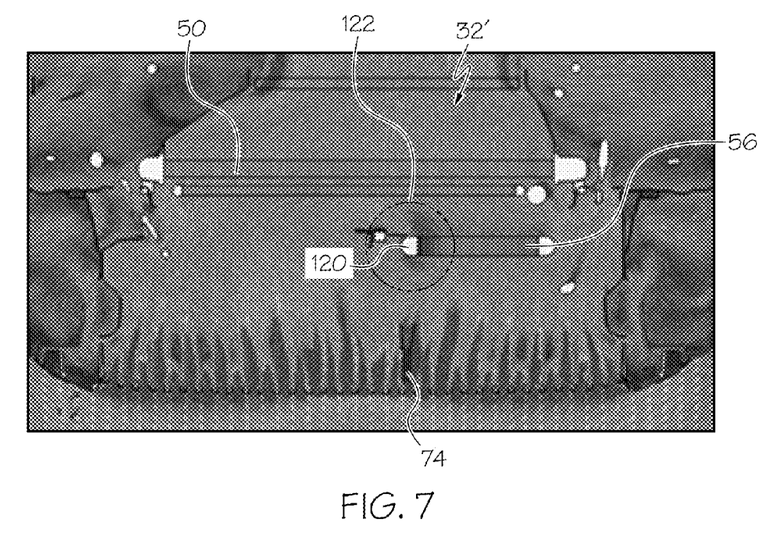
FIG. 7 shows a modified air flow through the front grille assembly of FIG. 3 including the air flow director fin, according to one or more embodiments shown and described herein.

Referring to FIGS. 6 and 7, the position and shape of the air flow director fin 74 changes the air flow characteristics into the engine compartment 32 compared to the air flow in the absence of the air flow director fin 74. FIG. 6 illustrates air flow into an engine compartment 32' and through the front grille assembly 28' without any air flow director fin 74. In this example, air flow (represented by shaded areas 115 showing increased air velocity) within area A tends to be directed outwardly away from an inboard edge 120 of the transmission cooler 56, which tends to create a region 122 of increased temperature within the transmission cooler 56, which can reduce the effectiveness of the transmission cooler 56 in removing heat from the transmission fluid arriving from the radiator 50. Any suitable process can be used to determine air flow, such as computer modeling.

Referring to FIG. 7, the engine compartment 32 is illustrated with the front grille assembly 28 including the air flow director fin 74 as described above. The air flow director fin 74 is positioned near the inboard edge 120 of the transmission cooler 56 to direct air flow toward the region 122 of increased temperature of FIG. 6 thereby cooling that region 122 and improving heat removal from the transmission fluid through transmission cooler 56. The shape of the air flow director fin 74 creates surfaces along which the air flow can ride into the engine compartment 32 and be directed toward the region 122. In the illustrated example, the air flow director fin 74 tends to straighten the air flow in a vehicle longitudinal direction from the more lateral direction illustrated by FIG. 6.

Figure 8:
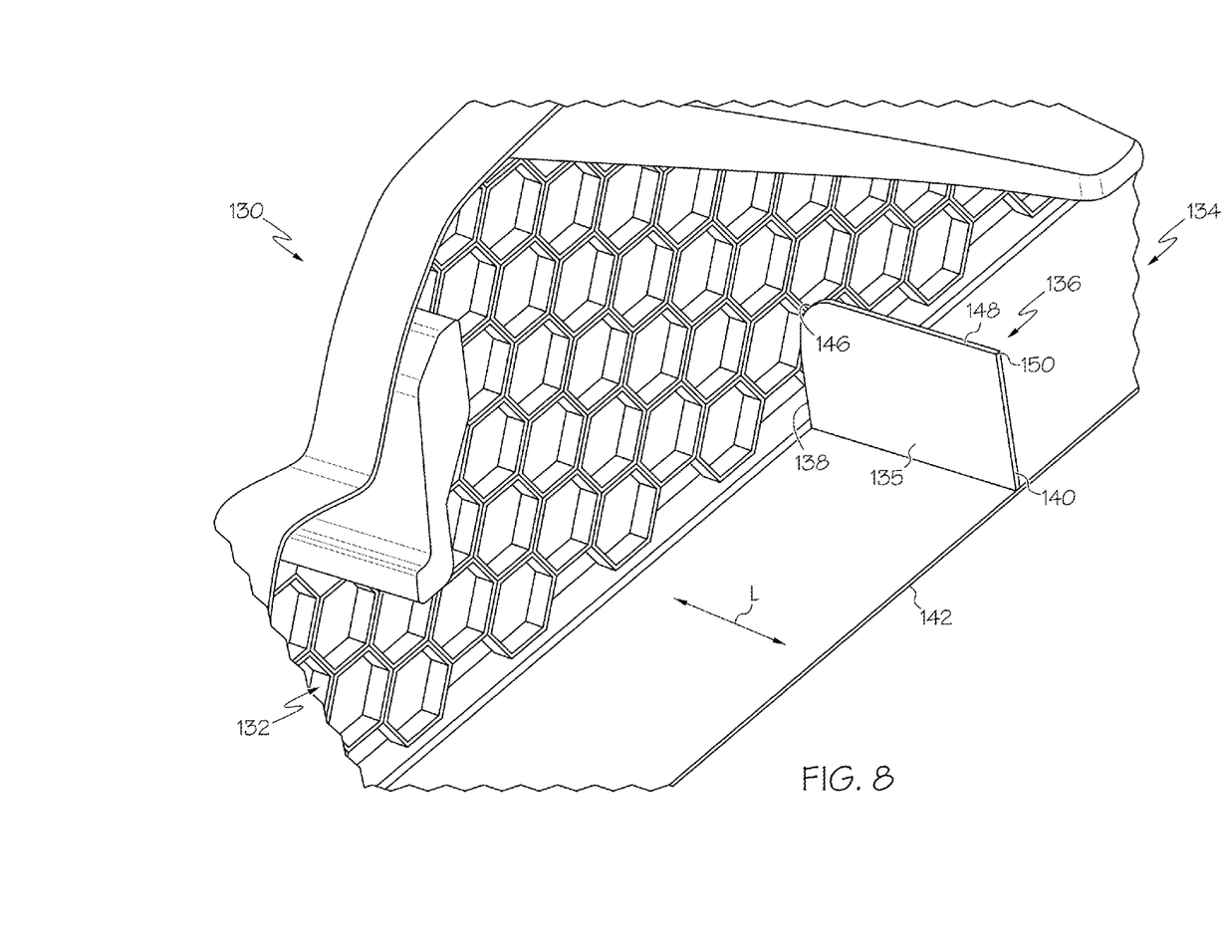
FIG. 8 is a perspective view of another embodiment of a front grille assembly including another embodiment of an air flow director fin, according to one or more embodiments shown and described herein.
Figure 9:
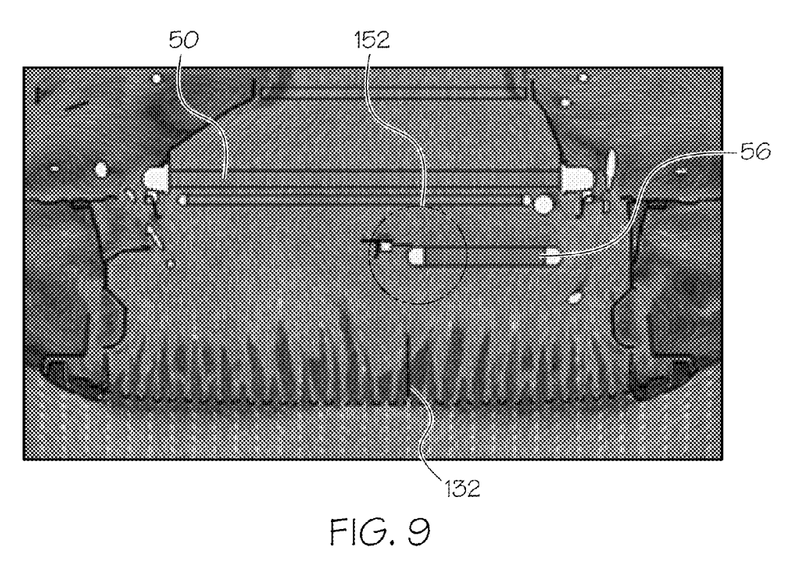
FIG. 9 shows a modified air flow through the front grille assembly of FIG. 8 including the air flow director fin, according to one or more embodiments shown and described herein.

Referring to FIG. 8, in another embodiment, a front grille assembly 130 includes a grille deflector 132 and a grille frame 134 that supports the grille deflector 132 at an upper grille assembly. The front grille assembly 130 is similar to the front grille assembly 28 described above, except that the front grille assembly 130 includes an air flow director fin 136 that is formed separately from the grille frame 134 and is connected thereto using any suitable connection, such as adhesives, welding, fastening, etc. In this embodiment, the air flow director fin 136 may have a plate-like body 135 that is shaped to have a front end 138 that is located near the grille deflector 132 and a rear end 140 that is located near a terminating end 142 of a lower support ledge 144 and is supported on and extends in the vehicle longitudinal direction along a length L of the lower support ledge 144. A taper portion 146 is provided between a top 148 and the front end 138 that reduces the height of the top 148 as the top 148 extends forward toward the front end 138. In some embodiments, the top 148 intersects the rear end 140 at a corner 150. Referring to FIG. 9, as above, the use of the air flow director fin 136 guides the air flow toward region 152 of a transmission cooler 154.

The above-described front grille assemblies provide an air flow director fin that can be used to manipulate air flow into an engine compartment near a location where the air enters the engine compartment through a grille deflector. Modification of air flow near the grille deflector allows for the air flow to be directed toward one or more regions of a transmission cooler to improve heat removal from the transmission cooler and improve transmission cooler performance compared to the front grille assembly without the air flow director. In some embodiments, the air may be directed to an outboard edge of the transmission cooler. However, an air flow director fin may be shaped and located to adjust air flow to any other area of the transmission cooler where, unmodified, air flow increase is needed. Further, while one air flow director fin is illustrated above, various embodiments may include more than one air flow director fin. Additionally, in embodiments where multiple air flow director fins are utilized, the air flow director fins may have different side wall and top wall shapes depending, at least in part, on the air flow modification needs and geometry within the engine compartment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    an engine compartment;
    a radiator located in the engine compartment;
    a transmission cooler located forward of the radiator in a vehicle longitudinal direction, the transmission cooler configured to receive transmission fluid from a transmission that has been cooled by the radiator;
    a front grille assembly located forward of the transmission cooler in the vehicle longitudinal direction, the front grille assembly comprising:
        a grille deflector that allows air to flow therethrough and into the engine compartment;
        a grille frame that supports the grille deflector at a front of the vehicle; and
        an air flow director fin that is located on the grille frame and rearward of the grille deflector, the air flow director fin projecting vertically from the grille frame to an elevation above a lower edge of the grille deflector and protruding into an air flow path created by the grille deflector into the engine compartment, thereby modifying a flow direction of air entering the engine compartment from an unmodified flow direction without the air flow director fin to a modified flow direction toward a region of the transmission cooler.

2. The vehicle of claim 1, wherein the grille frame comprises an upper support ledge and a lower support ledge, the air flow director fin located on the lower support ledge.

3. The vehicle of claim 2, wherein the air flow director fin is formed integrally with the lower support ledge.

4. The vehicle of claim 3, wherein the air flow director fin includes:
    a front end located near the grille deflector; and
    a rear end that intersects a terminating end of the lower support ledge, the air flow director fin extending along a length of the lower support ledge in the vehicle longitudinal direction.

5. The vehicle of claim 4, wherein the air flow director includes:
    a first side wall that projects vertically from the lower support ledge;
    a second side wall that projects vertically from the lower support ledge; and
    a top wall that extends between the first side wall and the second side wall;
    wherein the air flow director fin increases in width from the front end to the rear end.

6. The vehicle of claim 5, wherein at least one of the first side wall and the second side wall extends away from the other of the first side wall and the second side wall in a vehicle lateral direction.

7. The vehicle of claim 6, wherein the second side wall extends away from the first side wall in the vehicle lateral direction, the second side wall having a curved portion having a radius of curvature that extends in the vehicle lateral direction.

8. The vehicle of claim 1, wherein the air flow director fin is located nearer an inboard edge of the transmission cooler in the vehicle lateral direction than an outboard edge of the transmission cooler.

9. The vehicle of claim 1, wherein the air flow director fin is formed separately from the grille frame and is connected thereto.

10. The vehicle of claim 9, wherein the air flow director fin has a plate body.

11. A front grille assembly for a vehicle, comprising:
    a grille deflector that allows air to flow therethrough into an engine compartment of the vehicle;
    a grille frame that supports the grille deflector at a front of the vehicle, and an air flow director fin projecting vertically from the grille frame to an elevation above a lower edge of the grille deflector and protruding into an air flow path through the grille deflector into the engine compartment, thereby modifying a flow direction of air entering the engine compartment from an unmodified flow direction without the air flow director fin to a modified flow direction toward a region of a transmission cooler of the vehicle.

12. The front grille assembly of claim 11, wherein the grille frame comprises an upper support ledge and a lower support ledge, the air flow director fin located on the lower support ledge.

13. The front grille assembly of claim 12, wherein the air flow director fin is formed integrally with the lower support ledge.

14. The front grille assembly of claim 13, wherein the air flow director fin includes:
    a front end located near the grille deflector; and
    a rear end that intersects a terminating end of the lower support ledge, the air flow director fin extending along a length of the lower support ledge away from the grille deflector.

15. The front grille assembly of claim 14, wherein the air flow director includes:
    a first side wall that extends outwardly from the lower support ledge in a vehicle vertical direction;
    a second side wall that extends outwardly from the lower support ledge in the vehicle vertical direction; and
    a top wall that extends between the first side wall and the second side wall;
    wherein the air flow director fin increases in width from the front end to the rear end.

16. The front grille assembly of claim 15, wherein at least one of the first side wall and the second side wall extends away from the other of the first side wall and the second side wall in a vehicle lateral direction.

17. The front grille assembly of claim 16, wherein the second side wall extends away from the first side wall in the vehicle lateral direction, the second side wall having a curved portion having a radius of curvature that extends in the vehicle lateral direction.

18. The front grille assembly of claim 11, wherein the air flow director fin is formed separately from the grille frame and is connected thereto.

19. A method of directing air to a transmission cooler within an engine compartment of a vehicle, the method comprising:
    connecting a front grille assembly to a front of the vehicle, the front grille assembly comprising:
        a grille deflector that allows air to flow therethrough and into the engine compartment;
        a grille frame that supports the grille deflector at a front of the vehicle; and
        an air flow director fin that is located on the frame and rearward of the grille deflector; and
    positioning the air flow director nearer an inboard edge of the transmission cooler in a vehicle lateral direction than an outboard edge of the transmission cooler, the air flow director fin projecting vertically from the grille frame to an elevation above a lower edge of the grille deflector and protruding into an air flow path through the grille deflector into the engine compartment, thereby modifying a flow direction of air entering the engine compartment from an unmodified flow direction without the air flow director fin to a modified flow direction toward a region of the transmission cooler.

20. The method of claim 19, wherein the grille frame comprises an upper support ledge and a lower support ledge, the air flow director fin located on the lower support ledge, wherein the air flow director fin is formed integrally with the support ledge.

\* \* \* \* \*

UNITED STATES PATENT AND TRADEMARK OFFICE
CERTIFICATE OF CORRECTION

PATENT NO. : 10,005,413 B2  
APPLICATION NO. : 15/285962  
DATED : June 26, 2018  
INVENTOR(S) : Scott L. Frederick et al.

Page 1 of 1

It is certified that error appears in the above-identified patent and that said Letters Patent is hereby corrected as shown below:

In the Claims

In Column 9, Line(s) 7 - 8, Claim 20, after "formed integrally with the" insert --lower--, therefor.

Signed and Sealed this
Twenty-first Day of August, 2018

Andrei Iancu
*Director of the United States Patent and Trademark Office*